2,901,511

SUBSTITUTED HYDRAZINE PROCESS

Forrest R. Hurley, Glen Burnie, Md., assignor to W. R. Grace & Co., New York, N.Y., a corporation of Connecticut No Drawing. Application March 22, 1956
Serial No. 573,089

5 Claims. (Cl. 260—583)

This invention relates to organic substituted hydrazines. In one specific aspect, it relates to processes of preparing anhydrous organic substituted hydrazines in improved yields.

Substituted hydrazines are not uncommon. Such compounds as methylhydrazine, phenylhydrazine, and hydrazobenzene are well known; the utility of those compounds has been well established. Heretofore, such compounds have been prepared by a variety of methods. For example, methylhydrazine is prepared by a complex multi-step procedure (see Org. Synth. Coll. vol II, 1941); phenylhydrazine by reduction of a diazonium salt; hydrazobenzenes by the reduction of nitrobenzene. However, certain aspects of these reactions cannot be acquitted of undesirability. For instance, they are carried out in aqueous solutions; subsequent treatment is therefore necessary to prepare anhydrous substituted hydrazines. The economic factor weighs heavy in the preparation of substituted hydrazines using these methods. While most of the necessary reactants are available commercially, the cost of manufacture of certain of the substituted hydrazines is extremely high from the standpoint of both raw materials and subsequent purification procedures.

It has recently been discovered that chloramine reacts with primary amines and secondary amines to form organic substituted hydrazines. This wide group of possible reactants (selected to react with chloramine) have a common distinguishing feature; they all contain at least one replaceable hydrogen atom attached to the nitrogen atom. In essence then, chloramine reacts with an organic nitrogen containing compound having a replaceable hydrogen attached to the nitrogen in the liquid phase under substantially anhydrous conditions. Such a process is fully described in the co-pending application of H. H. Sisler and A. D. Kelmers, S.N. 418,783, filed March 25, 1954, which issued as U.S. Patent No. 2,806,-851 on September 17, 1957. Specifically, the process comprises passing an ammonia-stabilized anhydrous chloramine mixture into an anhydrous liquid amine having at least one active hydrogen attached to the amino nitrogen capable of reacting preferentially with chloramine. Amines having this characteristic are selected from the group consisting of primary acyclic amines, primary alicyclic amines, secondary acylic amines, secondary alicyclic amines and secondary heterocyclic amines. Sufficient ammonia is maintained in the reaction mixture to provide therein alkaline conditions at all times. The reaction may be conducted successfully in the presence of a solvent which is inert to both the products and the reactants. The particular substituted hydrazine is separated and recovered from the reaction mixture using standard laboratory techniques.

Chloramine can be easily obtained using the well-known process of Sisler et al., U.S. Patent No. 2,710,248. In that process, gaseous chlorine will react almost instantaneously with gaseous ammonia under anhydrous conditions according to the following equation:

$$2NH_3 + Cl_2 \rightarrow \rightarrow \rightarrow \rightarrow ClNH_2 + NH_4Cl$$

This reaction should be conducted in the presence of excess ammonia in order to insure that only chloramine (monochloramine) will be formed as a product. Since chloramine is itself unstable and cannot be isolated in pure form, it is necessary that possible decomposition reactions be depressed. The presence of the additional ammonia accomplishes this result. Nitrogen may be conveniently used for this purpose and also as a diluent for the chloramine-ammonia mixture, although its presence is not required. The process for chloramine manufacture requires relatively little equipment, and it can be conveniently operated on a continuous basis.

The chloramine-primary or secondary amine reaction is subject to certain unfortunate limitations. It is difficult to consistently obtain substituted hydrazines in high yield using this process. It is generally accepted that these reduced yields are caused by a chloramine-hydrazine decomposition reaction. It is believed that the presence of strong acid ions (source of active protons) in the reaction mixture catalyze this decomposition reaction. The present invention offers considerable improvement by providing a mechanism for combining the active proton firmly with another substance, whereby the catalytic activity of the proton is substantially reduced without having any harmful effect on the substituted hydrazine formed during the reaction.

It is therefore an object of the present invention to provide improved yields of substituted hydrazines.

In accordance with the present invention a tertiary amine is included as an additional constituent in the chloramine-primary amine (or alternative reactant) reaction mixture. The tertiary amine reduces the catalytic activity of the mono (or di) substituted hydrazinium ion, thereby inhibiting the acid catalyzed decomposition reaction. The presence of the tertiary amine has two secondary, but by no means unimportant, effects. It acts as a promotor for the substituted hydrazine formation reaction, and it causes regeneration of primary amine that would otherwise be consumed by side reactions.

My invention is more clearly understood when reference is made to the equations appearing hereunder. It should be noted that a primary amine (designated by the formula $RNH_2$, wherein R can be an alkyl, aralkyl, cycloalkyl, aminoalkyl or hydroxyalkyl radical) is selected for discussion for the purpose of convenient illustration rather than limitation. The principle of my invention is equally applicable to secondary amines

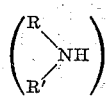

R and R' for the secondary amines are the same as specified hereabove as R for the primary amine. R and R' can also be taken in combination to form a heterocycle. Specifically, such primary amines as methylamine, ethylamine, propylamine, isopropylamine, ethanolamine, ethylenediamine, benzylamine, aniline, and cyclohexylamine are suitable. Such secondary amines as dimethylamine, diethylamine, dipropylamine, diisopropylamine, diethyanolamine, dicyclohexylamine, n-aminomorpholine, and n-aminopiperidine work equally well. R″ in the equations hereunder is a lower alkyl radical having from 2–6 carbon atoms.

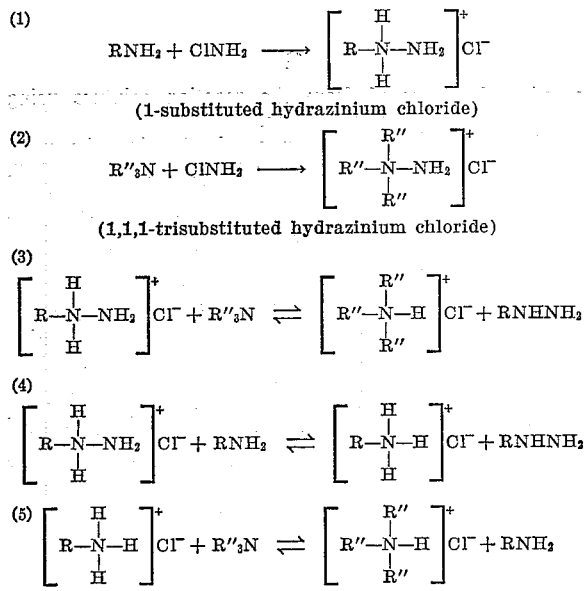

The primary alkylamine (for the purpose of discussion assume R=alkyl) reacts with chloramine to produce 1-substituted alkyl hydrazinium chloride (Equation 1). If a tertiary amine (e.g. a tri-alkyl amine) is present in the system, this amine reacts with chloramine in a competing reaction to produce 1,1,1-trisubstituted alkyl hydrazinium chloride (Equation 2). Since the product of Equation 1 is a quaternary nitrogen containing one or more hydrogen atoms attached to it, it will be subject to a protolysis reaction (see Kittsley, S. L., Physical Chemistry, Barnes & Noble, Inc., New York, p. 146) with the strongest base present to give a substituted hydrazine. Since in anhydrous media, tertiary amines as a class exhibit a higher degree of basicity than the primary amines, the hydrazinium chloride formed in Equation 1 will generally react with the tertiary amine to produce a substituted hydrazine and a trialkyl ammonium chloride (Equation 3). If there were no tertiary amines present in the system, the reaction would proceed completely according to Equation 4, with the resultant formation of alkyl ammonium chloride. Even in the presence of a tertiary amine, the reaction of Equation 4 will occur to a limited extent. However, the tertiary amine will react with the product of Equation 4 (alkyl ammonium chloride) to regenerate the primary amine (Equation 5). Equations 3, 4, and 5 are equilibrium reactions; the extent to which they take place depends upon the relative basicity of the tertiary amine and primary amine (or alternate reactant) selected. When the strength of the tertiary amine base is considerably greater than the primary amine, Reaction 3 will have a greater tendency to occur to the exclusion of Reaction 4.

The reduction in yield of substituted hydrazine is believed to be the result of an acid-catalyzed decomposition reaction between the substituted hydrazine and chloramine. By the addition of the tertiary amine, the trialkyl ammonium chloride, a weaker acid, is produced in lieu of the alkyl ammonium chloride that would be formed by the reaction of the hydrazinium chloride with a primary amine, hence the yield of substituted hydrazine is increased. The reaction of Equation 2 serves to explain the adverse results which are obtained when a large quantity of tertiary amine is present in the reaction mixture, since this reaction competes with the chloramine in the mixture to form instead of a substituted hydrazine, 1,1,1-trisubstituted hydrazinium chloride. Obviously, therefore, the amount of tertiary amine required to practice the method of my invention must be approximately equivalent to the amount of mono-substituted (or di-substituted if an alternate reactant is used) hydrazinium ion present in the solution to permit a complete reaction with the 1-substituted alkyl hydrazinium chloride as it is being formed (Equation 1). A similar series of equations (to Equations 1–5) can be shown for the reaction of chloramine and a secondary amine, conducted in the presence of a wide range of tertiary amines.

If the complete mixing of the two reactants is instantaneous, the tertiary amine may be previously added to the liquid organic nitrogen-containing solution. The amount present of course is predicated on the quantity of the monosubstituted or disubstituted hydrazinium chloride to be formed during the reaction. While this method is acceptable it is not the preferred procedure. I have found that the best yields of substituted hydrazines can be obtained when the chloramine and the tertiary amine are added to the organic nitrogen-containing reactant simultaneously. Both the chloramine and the tertiary amine are added continuously; the quantity of tertiary amine added being sufficient at all times to react with the mono (or di) substituted hydrazinium ion as it is being formed.

My novel reaction works decidedly well at atmospheric pressure. No particular temperature range is necessary, but it is desirable to keep the reaction temperature about 10° C. below the boiling point of the reaction mixture.

The rate of addition of the tertiary amine is relatively easy to estimate. After the appropriate organic nitrogen-containing compound is selected and after the selection of the appropriate tertiary amine, rate reaction studies can be undertaken to determine the rate of formation of the mono (or di) substituted hydrazinium ion.

While the foregoing discussion is concerned primarily with the use of a trialkyl tertiary amine, this is obviously by way of illustration and not by way of limitation. Specifically such tertiary amines as triethylamine, tripropylamine, triisopropylamine, tri-n-butylamine, triamylamine, tricyclohexylamine, methylpiperidine, and n-methylmorpholine, are very suitable for my novel process. In general, any organic base that is stronger than the primary or secondary amine reactant with a lesser affinity (than the primary or secondary amine) for chloramine would work successfully.

Trimethylamine has been found less satisfactory for use in my process than other common lower alkyl tertiary amines. (By lower alkyl I mean those alkyl radicals having from 2–6 carbon atoms). This is easily explained by referring again to the reaction mechanism (Equations 1–5). If the reaction of Equation 2 with the use of trimethylamine proceeds at a greater rate than the reaction of Equation 1 a portion of the chloramine would be consumed and would be unavailable to form the substituted hydrazine when the two reactants are added simultaneously. If the trimethylamine was present initially in solution, it may be used up by reaction with chloramine and would therefore be unavailable as a base for the reaction with the mono (or di) substituted alkylhydrazinium chloride. In this case, the mono-substituted hydrazinium chloride would react with the primary amine (or alternate reactant) to produce a substituted ammonium chloride, a stronger acid than the trialkyl ammonium chloride (Equation 4), and the yield of substituted hydrazine would be reduced by the aforementioned acid-catalyzed decomposition reaction.

Standard recovery techniques (viz: crystallization, solvent extraction, distillation, etc.) can be used to separate the substituted hydrazine from the reaction mixture.

My invention is further illustrated by the following examples:

Example I

A generator was constructed to provide a chloramine-ammonia gas stream using the aforementioned process of Sisler et al.

About 35 mm. of a dilute solution of chloramine in liquid ammonia was prepared and held at a temperature of −78° C. I added this solution to an anhydrous solution containing 300 ml. of methylamine and 5 ml. triethylamine. The reaction occurred at −8° C. and the mixture was maintained at this temperature for one hour, after which the excess methylamine was evaporated slowly. The residue was dissolved in water. The chloride content was then estimated by the Volhard method, and the methylhydrazine by the acid iodate method. A total of 11.24 millimoles methylhydrazine and 14.92 milliequivalents of chloride ion was found. These results correspond to a 75% yield of methylhydrazine based on the total chloride (as chloramine). A similar experiment was tried omitting the triethylamine; the resulting yield of methylhydrazine was only 55%.

Example II

A dilute solution of chloramine and liquid ammonia prepared as described in Example I was added to a solution comprising 225 ml. of methylamine and 100 ml. triethylamine. The reaction occurred at −6° C. The mixture was kept at this temperature for one hour after which the excess methylamine was evaporated slowly. Using the analytical procedure described in Example I, a total of 12.2 millimoles of hydrazine and 18.5 milliequivalents of chloride ion was found. These results correspond to a 66% yield of methylhydrazine.

Example III

The procedure of Example I was repeated using a dilute solution of chloramine in liquid ammonia at a temperature of −78°. I added this solution to an anhydrous solution containing 300 ml. of methylamine and 20 ml. tri-n-butylamine. The reaction temperature was held at −9° C. for one hour, and the excess methylamine was then evaporated. By repeating the analytical procedure of Example I, I found a total of 11.5 millimoles methylhydrazine and 18.2 milliequivalents chloride ion, such results indicate a 63% of methylhydrazine.

Example IV

I added about 35 ml. of a dilute solution of chloramine in liquid ammonia (prepared according to Example I) at a temperature of −78° C. to an anhydrous solution containing 320 ml. of methylamine plus 2 ml. triethylamine. The reaction temperature was −12° C., and the mixture was maintained at this temperature for one hour. The excess methylamine was evaporated and the standard analytical procedure was followed to evaluate the results. A 61% yield of methylhydrazine was obtained.

I have therefore developed a novel improvement that substantially furthers the commercialization of a process for producing anhydrous substituted hydrazines. While the utility of these products is already well established, my improved reaction will make them available in heretofore unprecedented quantities. The wide availability of substituted hydrazines should expand their use in the fields of resins, coatings, adhesives, plastics, insecticides, biocides, pharmaceuticals, textile treating agents, plasticizers, and rubber softeners.

I claim:

1. In a process for making substituted hydrazines comprising passing an ammonia-stabilized anhydrous chloramine mixture into an anhydrous liquid amine, having at least one active hydrogen attached directly to the amino nitrogen capable of reacting preferentially with chloramine selected from the group consisting of primary acyclic amines, primary alicyclic amines, secondary acyclic amines, secondary alicyclic amines and heterocyclic amines and maintaining sufficient ammonia in the reaction mixture to provide therein alkaline conditions, the improvement comprising adding continuously to said anhydrous liquid amine a tertiary amine of the general formula $R_3N$ wherein R is a lower alkyl radical having at least two and not more than six carbon atoms in a quantity equivalent to the amount of free hydrazinium ion being formed by the reaction between said chloramine and the said anhydrous liquid amine, and separating the mixture into its component parts to recover the substituted hydrazine therefrom.

2. A process according to claim 1, wherein the anhydrous liquid amine is methylamine and the tertiary amine is triethylamine.

3. In a process for making substituted hydrazines comprising passing an ammonia-stabilized anhydrous chloramine mixture into an anhydrous liquid amine having at least one active hydrogen attached directly to the amino nitrogen capable of reacting preferentially with chloramine selected from the group consisting of primary acyclic amines, primary alicyclic amines, secondary acyclic amines, secondary alicyclic amines and heterocyclic amines and maintaining sufficient ammonia in the reaction mixture to provide therein alkaline conditions, the improvement comprising adding continuously to said anhydrous liquid amine, in the presence of a mutual solvent which is unreactive with respect to both the products and the reactants, a tertiary amine of the general formula $R_3N$ wherein R is a lower alkyl radical having at least two and not more than six carbon atoms in a quantity equivalent to the amount of free hydrazinium ion being formed by the reaction between said chloramine and the said anhydrous liquid amine, and separating the mixture into its component parts to recover the substituted hydrazine therefrom.

4. In a process for making substituted hydrazines comprising passing an ammonia-stabilized anhydrous chloramine mixture into an anhydrous liquid amine having at least one active hydrogen attached directly to the amino nitrogen capable of reacting preferentially with chloramine selected from the group consisting of primary acyclic amines, primary alicyclic amines, secondary acyclic amines, secondary alicyclic amines and heterocyclic amines and maintaining sufficient ammonia in the reaction mixture to provide therein alkaline conditions, the improvement comprising adding continuously to said anhydrous liquid amine a tertiary amine of the general formula $R_3N$ wherein R is a lower alkyl radical having at least two and not more than six carbon atoms equivalent to the amount of free hydrazinium ion being formed by the reaction between said chloramine and the said anhydrous liquid amine, while maintaining said reaction mixture at a temperature below its boiling point and separating said mixture into its component parts to recover the substituted hydrazine therefrom.

5. In a process for making substituted hydrazines comprising passing an ammonia-stabilized anhydrous chloramine mixture into an anhydrous liquid amine, having at least one active hydrogen attached directly to the amine nitrogen capable of reacting preferentially with chloramine selected from the group consisting of primary acyclic amines, primary alicyclic amines, secondary acyclic amines, secondary alicyclic amines and heterocyclic amines and maintaining sufficient ammonia in the reaction mixture to provide therein alkaline conditions, the improvement comprising adding a tertiary amine of the general formula $R_3N$ wherein R is a lower alkyl radical having at least two and not more than six carbon atoms in a quantity equivalent to the amount of free hydrazinium ion to be formed by the reaction between said chloramine and said anhydrous liquid amine prior to adding said chloramine, and separating the mixture into its component parts to recover the substituted hydrazine therefrom.

No references cited.